(12) United States Patent
Wilson et al.

(10) Patent No.: US 7,381,474 B2
(45) Date of Patent: Jun. 3, 2008

(54) COATED HARDWOOD COMPOSITE FLOORING HAVING REDUCED SURFACE CRACKING

(75) Inventors: Burton L. Wilson, Pine Knot, KY (US); Gary A. Sigel, Millersville, PA (US); Larry W. Leininger, Akron, PA (US); Michael H. Maney, Oneida, TN (US); Craig W. DeSantis, Brunnerville, PA (US)

(73) Assignee: AWI Licensing Company, Wilmington, DE (US)

( * ) Notice: Subject to any disclaimer, the term of this patent is extended or adjusted under 35 U.S.C. 154(b) by 260 days.

(21) Appl. No.: 10/459,977

(22) Filed: Jun. 12, 2003

(65) Prior Publication Data

US 2004/0038062 A1    Feb. 26, 2004

Related U.S. Application Data

(60) Provisional application No. 60/388,419, filed on Jun. 13, 2002.

(51) Int. Cl.
*B32B 23/04* (2006.01)
(52) U.S. Cl. .................. 428/532; 428/535; 428/537.1; 428/541; 427/297
(58) Field of Classification Search ................ 428/541, 428/532, 535, 537.1; 427/297
See application file for complete search history.

(56) References Cited

U.S. PATENT DOCUMENTS

| | | | |
|---|---|---|---|
| 3,663,261 A | | 5/1972 | Miettinen et al. ............. 117/59 |
| 4,205,018 A | * | 5/1980 | Nagasawa et al. .......... 525/404 |
| 4,291,101 A | * | 9/1981 | Tanizaki et al. ............ 428/514 |
| 5,496,589 A | | 3/1996 | Igarashi et al. ............. 427/331 |
| 5,605,915 A | | 2/1997 | Vuligonda et al. .......... 514/356 |
| 5,866,270 A | * | 2/1999 | West, Jr. ..................... 428/541 |
| 6,121,381 A | * | 9/2000 | Deguchi et al. ............ 525/126 |
| 6,825,243 B2 | * | 11/2004 | Ohno et al. .................. 522/97 |

FOREIGN PATENT DOCUMENTS

| | | |
|---|---|---|
| EP | 0 531 551 | 3/1993 |
| WO | WO 00/52105 | 9/2000 |
| WO | WO 01/51533 | 7/2001 |

OTHER PUBLICATIONS

A. J. Stam, Forest Products Journal, "New and Better Ways to Dimensionally Stabilize Wood", 9(1959):3, 107-110.
Harry C. Leslie, Man Society Technology, A Journal of Industrial Arts Education, "Woodworker Heart", 33(1):13-16, Sep., Oct. 1973.
ASTM D1211-97—Standard Test Method for Temperature-Change Resistance of Clear Nitrocellulose Lacquer Films Applied to Wood.
International Search Report—International Application No. PCT/US03/18599 dated Jun. 12, 2003.

* cited by examiner

*Primary Examiner*—Leszek Kiliman

(57) ABSTRACT

The methods for making a coated thin veneer, plank or wood product in which the coated surface does not crack due to instability of the wood involve applying to a veneer, plank or wood product a composition including a hydrophilic polymer and a reactive monomer or a composition including a reactive (meth)acrylate. In one embodiment, the hydrophilic polymer is a polyalkylene glycol, such as polyethylene glycol. The composition also advantageously includes a thermally activated free radical initiator, a photoinitiator or both. The veneer is further laminated into wood product boards that are cut down to planks. In another aspect of the current invention, several solvent based resins are roll coated onto the loose and/or tight side of the thin veneer or unfinished plank wood, dried to remove solvent, and exposed to UV radiation to cure the resinous material by radical initiation of the photoinitiator that leads to polymerization. Further polymerization of the resin material within the pores or voids occurs by heat induced initiation of the organic peroxides at the time of lamination in the case of veneer or by UV radiation exposure in the case of planks.

16 Claims, No Drawings

COATED HARDWOOD COMPOSITE FLOORING HAVING REDUCED SURFACE CRACKING

CROSS REFERENCE TO RELATED APPLICATION

This document claims priority to and the benefit of the filing date of provisional application entitled "Method and Process to Reduce Surface Cracking for Coated Hardwood Composite Flooring," assigned Ser. No. 60/388,419, and filed Jun. 13, 2002, which is hereby incorporated by reference.

FIELD OF THE INVENTION

This invention relates to a method for making a coated thin veneer, thicker plank and composite wood product wherein the coated surface does not crack due to instability of the wood composite and to the coated veneer, plank and composite wood product.

BACKGROUND OF THE INVENTION

Wood composites such as plywood are used in many indoor applications, in furniture and often in flooring applications. A major advantage of plywood over solid wood is that plywood does not warp, cup or twist, and does not swell or "move" as much as solid wood. However, there are many limitations to using plywood. The veneer used to cover the individual plys is often very thin, and prone to delamination. The coatings must also be sufficient to protect the thin veneer from scratching, because a scratch that goes through the thin veneer shows through to the underlying, less desirable inner plys. Also, water may cause swelling and buckling in plywood, as well as cracking. Thin veneer composite wood products of the prior art often have a coated surface that cracks due to the instability of the wood composite.

Polyethylene glycol (PEG) has a high molecular weight and is not very volatile. PEG has been used to treat wood by replacing the water with PEG, so that the passage of water in and out of the wood is no longer possible. The wood is typically heated in a vat containing PEG for an extended period of time to remove substantially all of the water and replace it with PEG. This type of process is not typically performed on veneer. Rather, these methods are used to stabilize 'green' wood and rely on materials such as polyethylene glycol to enter the cell walls of the 'green' wood and improve dimensional stability. These methods have been previously published. See "New and Better Ways to Dimensionally Stabilize Wood", A J. Stam, Forest Products Journal, 9(1959):3, 107-110, and "Woodworker Heart," Harry C. Leslie, Man Society Technology, A Journal of Industrial Arts Education, 33(1):13-16, September, October, 1973. A limitation of these processes is that they tend to rely on long soak times that are not typically practical for commercial production.

Veneer and planks have been impregnated with PEG and methylmethacrylate using a vacuum process to harden the veneer and planks. This batch process yields a product in which the concentration of PEG and methylmethacrylate is substantially uniform throughout the veneer and plank.

It would be advantageous to have a continuous method for treating veneer and planks using conventional coating apparatus, such that the treated veneer and planks, and resulting coated wood composite, are not prone to cracking. Further, it would be advantageous to have such a method, which minimizes the amount of treating material necessary to deter wood checking. The present invention provides such a method, and the corresponding treated wood composite.

SUMMARY OF THE INVENTION

Methods for making a coated thin veneer composite wood product wherein the coated surface does not crack due to instability of the wood composite, and composite wood products prepared according to the method are disclosed. The composites exhibit a dramatic reduction in cracking of the coating upon exposure to a modified version of the Hot/Cold checking cycling ASTM D1211-97 test.

The methods involve applying a solution including (a) a hydrophilic polymer and a reactive monomer or (b) a (meth)acrylate to a veneer or plank. As used herein, the term "(meth)acrylate" means "acrylate, methacrylate, a combination of acrylate and methacrylate, acrylic, methacrylic, and a combination of acrylic and methacrylic."

In one embodiment, the hydrophilic polymer is a polyalkylene glycol, such as polyethylene glycol. In one embodiment, the reactive monomer is a hexanediol diacrylate or hexanediol dimethacrylate. The reactive monomer reacts in the presence of the hydrophilic polymer forming an interpenetrating polymer network.

The solution also advantageously includes a polymerization initiator, typically a thermally activated free radical initiator such as azo-bisisobutyronitrile (AIBN) or peroxides such as benzoyl peroxide, dicumyl peroxide, t-butyl hydroperoxide, t-butyl perbenzoate, such that the coated veneer can be cured after the solution is applied to the veneer.

The veneer can be essentially any thickness between about $1/100$ inch and about $1/8$ inch, but is most typically between about $1/16$ and about $1/32$ inch in thickness. Although any type of wood can be used, the veneer is typically a decorative hardwood, such as oak, including Appalachian red oak, Appalachian white oak, Northern red oak, Northern white oak, cherry, walnut and the like, and the inner plys are typically a lesser grade wood, such as poplar. In one embodiment, the veneers have a thickness of about 170 mils and are formed from Appalachian oak, and the core ply has a thickness of about 170 mils and is formed from poplar.

In one embodiment, the hydrophilic polymer is polyethylene glycol, and the ratio of polyethylene glycol/reactive monomer/initiator is about 49.5/49.5/1; the weight average molecular weight for the polyethylene glycol is about 600; the reactive monomer is hexanediol dimethacrylate (HDDMA) and the initiator is azo-bisisobutyronitrile (AIBN).

In operation, a veneer board can be fed into a spread roll coater that applies the composition. The coated veneer board can then be heated to a suitable temperature to partially cure the composition. The core ply is typically coated on one or both sides with a standard adhesive, for example, a water-based urea formaldehyde adhesive, and the treated top veneer and, optionally, bottom veneer are placed in contact with the appropriate surface of the adhesive coated core ply. The composite is then consolidated under heat and pressure.

The resulting consolidated plywood panel is cut or sawed as needed, for example, into flooring wood strips, which can then be subjected to routine operations, such as face sanding, staining and finishing. Such processes are well known to those of skill in the art.

In one aspect of the current invention, a mixture of polyethylene glycol and hexanediol dimethacrylate (HDDMA) with a radical initiating catalyst is roll coated (the method of application is not limited to roll coating but can include other coating methods, e.g., spray, curtain coat, Mylar bar) onto both sides of a veneer, and oven processed to allow the resin to penetrate into the pores and voids, as well as partially cure the resin material. The veneer is further laminated into wood product boards that are cut down to planks. Planks are further processed on the finishing line where stain, and several UV coatings are applied to afford the final product.

In another aspect of the current invention, several solvent based resins are roll coated onto the loose side and/or tight side of the thin veneer or unfinished plank wood (plank wood can be of solid or composite construction), dried to remove solvent, and exposed to UV radiation to cure the resinous material by radical initiation of the photoinitiator that leads to polymerization. Further polymerization of the resin material within the pores or voids occurs by heat-induced initiation of the organic peroxides at the time of lamination in the case of veneer or by UV radiation exposure in the case of planks. These resin materials include a (meth)acrylate, which is polymerized in situ yielding a polymer reaction product.

In an additional embodiment, a (meth)acrylic containing solution at least partially fills the pores and voids near the surface of the wood component. At least some of the solvent is driven off, drying the solution.

As used herein "cured product" means the result of at least partially drying and/or partially curing the composition, which is applied to the surface of the wood component. Unless the context would indicate otherwise, the composition may be the mixture of the hydrophilic polymer and reactive monomer, or the (meth)acrylate, including (meth) acrylic containing solutions.

DETAILED DESCRIPTION OF THE INVENTION

This invention relates to a method for improving the dimensional stability of thin veneer wood and to prevent cracking of the coating of a finished wood product by applying to the veneer or plank a resin material that fills voids, lathe checks and spaces between grains. Further processing, followed by standard lamination, provides a coated wood product. The end result is a treated wood veneer surface that when processed into a finished wood product, such as a flooring product, exhibits a dramatic reduction in cracking of the coated surface (for example, as determined by a modified version of the Hot/Cold cycling ASTM D1211-97 test).

The invention solves the problem currently known in the wood industry as 'checking' on coated composite wood products—cracking of the coating. The methods described provide multiple means to reduce cracking of the coated surface under conditions that cause "checking". The resulting wood composite products are typically of higher quality as changes in environment will not cause undesirable cracks in the coated product. This is particularly advantageous when the wood composite material is used in flooring operations, where several existing wood floor manufacturers currently have issues associated with coating cracking in installed wood floors.

The invention also offers a process and cost advantage over conventional process techniques such as vacuum impregnation as referenced, for example, in U.S. Pat. Nos. 3,663,261, 5,605,915 and 5,866,270. The methods allow for a continuous process that is compatible with existing wood composite operations, including wood flooring processes. Further, since the resin material, which is not subjected to a vacuum, remains concentrated near the surface of the veneer or plank, less of the resin material is necessary to deter checking.

In fact, since it is only capillary action that transports the resin material towards the center of the wood component, unless the veneer is very thin, the wood very soft or the wood has cracks that penetrate into the center portion of the wood component, the center portion remains substantially free of the resin material and therefore substantially free of the resultant cured product. Even with thin, soft and cracked wood, the concentration of the cured product near the surface of the wood component is at least twice, or three times, or five times, greater than the concentration at the center portion of the wood component.

In another embodiment, the veneer surface is treated by treating the surface of a laminated veneer/core (plank). Accordingly, the invention provides multiple, practical methods of solving a major problem of cracking of the coated surface of composite wood products from seasonal changes and cycles.

Various aspects of the invention are described in more detail below:

I. Coating Compositions

In one embodiment, the coating compositions used to coat the veneer as described herein typically include at least one hydrophilic polymer, at least one reactive monomer, and at least one thermal initiator. The ranges of hydrophilic polymer and the reactive monomer are each typically between about 30 and about 70 percent by weight of the composition, more typically between about 40 and about 60 percent by weight of the composition. The range of thermal initiator in the composition is typically between about 0.5 and about 10 percent by weight of the composition. Most typically it is about 1% of the composition.

The types of chemistries demonstrated in this invention include hydrophilic polymer/reactive monomer mixtures such as polyethylene glycol/(meth)acrylate mixtures and polyethylene glycol/water/(meth)acrylate mixtures, and reactive monomers can include urethane (meth)acrylates, multifunctional (meth)acrylates, polyester (meth)acrylates, and other reactive monomers described in more detail below. Urethane (meth)acrylate and multifunctional (meth)acrylate solutions, suspensions or dispersions can also be used, alone or in combination with the hydrophilic polymer/reactive monomer mixture.

Hydrophilic polymers

Any hydrophilic polymer that can penetrate wood and stabilize the wood to water permeation can be used. Examples of suitable hydrophilic polymers include polyethylene glycol and pentracryl.

When the hydrophilic polymer is polyethylene glycol, the weight average molecular weight is typically between about 400 and about 1000. The molecular weight can be selected so that the polyethylene glycol is liquid at the temperature at which it is applied to the veneer. If the veneer is at room temperature when the polyethylene glycol is applied, then the molecular weight is typically less than about 1000, more typically about 550 to about 650.

The hydrophilic polymer can typically be present from about 30 wt. % to about 70 wt. %. Depending on the desired properties of the veneer (thickness, wood type, etc.) and the molecular weight and functionality of the reactive monomer, values outside this range are possible. Those of skill in the art can readily optimize the concentration of the hydrophilic polymer and the reactive monomer.

In some embodiments, water may be added to the hydrophilic polymer.

Reactive Monomers

A reactive monomer system is used in combination with the hydrophilic polymer to penetrate the wood and prevent cracking. Suitable reactive monomer systems include at least one ethylenically unsaturated addition-polymerizable monomer which is polymerizable upon exposure to a source of free radicals and/or radiation such as UV or EB radiation, or, alternatively, to heat, depending on the type of free radical initiator. Specific examples of reactive monomers that can be used include UV curable resin materials derived from ester acrylates, such as hexanediol dimethacrylate, urethane acrylates, isocyanate terminated urethane acrylates, water-based urethanes and acrylic polymers.

The monomer can include acrylate or methacrylate unsaturation, as well as other types of monomer that include non-(meth)acrylate vinyl unsaturation. The reactive monomer system can include mono-, di-, tri-, and higher functional monomers. The number average molecular weight of the monomer is typically low enough to allow it to be a liquid at room temperature, and in general, is less than about 1,000 g/mol. Mixtures of monomers can be used.

Examples of the monofunctional reactive monomers include 2-hydroxyethyl(meth)acrylate, isobornyl acrylate (IBOA), phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxyethoxy)ethyl acrylate, n-lauryl acrylate, 2-phenoxyethyl acrylate, glycidyl methacrylate, glycidyl acrylate, acrylated methylolmelamine, and 2-(N,N-diethylamino)-ethyl acrylate.

Examples of polyfunctional reactive monomers include neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylolpropane triacrylate which contains from about 2 to about 20 moles of either ethylene or propylene oxide, triethylene glycol diacrylate, tetraethylene glycol diacrylate, polyethylene glycol diacrylate, any corresponding methacrylates thereof, and combinations thereof.

Examples of non-(meth)acrylate reactive monomers include vinyl, N-vinyl, vinyl-ether, vinylester and allyl groups. Suitable examples of this type of reactive monomer include N-vinylformamide (NVF), adducts of NVF with diisocyanates such as toluene diisocyanate and isophorone diisocyanate, derivatives of N-vinylformamide, N-vinylcaprolactam, N-vinylpyrrolidone, butyl-vinylether, 1,4-butyl-divinylether, dipropyleneglycol-divinylether, the vinylester of acetic acid, lauryl acid, dodecanoic acid or cyclohexyl-carboxylic acid, adipic acid, glutaric acid or the like, triallylisocyanurate, diallylphthalate, butyl-allyl-ether and the like. In one embodiment, the monomers are di-functional.

The reactive monomer can be present from about 30 wt. % to about 70 wt. %. Depending on the desired properties of the veneer (thickness, wood type, etc.) and the molecular weight of the hydrophilic polymer, values outside this range are possible. Those of skill in the art can readily optimize the concentration of the hydrophilic polymer and the reactive monomer.

Thermal Initiator

Thermal initiators such as azo-bisisobutyronitrile (AIBN) or peroxides such as benzoyl peroxide, dicumyl peroxide, t-butyl hydroperoxide, and t-butyl perbenzoate are well known and are available from common chemical suppliers. The thermal initiator is present in an amount sufficient to at least partially cure the reactive monomer when heat is applied to a veneer coated with the composition. The amount typically ranges from about 0.5 to about 10 wt. % by weight of the composition. Typically, about 1% is used.

Photoinitiator

In some embodiments, it may be desirable to use a photoinitiator in place of or in addition to the thermal initiators. The photoinitiators can catalyze or accelerate cure by exposure to ultraviolet radiation. If the polymerizable material is cured by exposure to electron beam radiation, a photoinitiator is not typically used.

The photoinitiator can be any of the known photoinitiators such as benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxy-acetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butylbenzophenone, isobutyl ether-benzoic acetate, benzil, benzilic acid, amino benzoate, methyl blue, 2,2-diethoxyacetophenone, 9,10-phenanthrenequinone, 2-methyl anthraquinone, 2-ethyl anthraquinone, 1-tert-butylanthraquinone, 1,4-naphthaquinone, isopropylthioxanthone, 2-isopropylthioxanthone, 2-methylthioxanthone, 2-decylthioxanthone, 2-dodecylthioxanthone, 2-methyl-1, [4-(methylthio)phenyl]-2-morpholinopropanone-1, combinations thereof and the like.

The optional photoinitiator or combination of photoinitiators is typically used in an amount ranging from about 1 to about 10 wt. % by weight of the composition.

II. Composite Wood Core

The composite wood core can have virtually any number of plys, but typically has between 1 and 20 plys, more typically, 1, 3, 5, 7 or 9 plys. The plys are typically a relatively inexpensive, but advantageously dimensionally stable, wood such as poplar. In the industry, plywood is typically available in a variety of thicknesses, ranging from ⅛ to 1 inch, and is more typically ⅜, ½ or ¾ inch material. The thickness is generally determined by the number of individual plys, including the outer veneer layer or layers.

In some embodiments, it is not necessary to have a decorative veneer on both sides. This is particularly true when one face is never seen, for example, in flooring operations where one face is seen and the other is attached to or at least placed over a subfloor. However, veneer flooring often includes veneer on both faces so that the best match between adjacent flooring strips can be obtained.

In some embodiments, the veneer is not applied to a plywood core, but rather, to a particle board, medium density fiberboard, chipboard, solid wood or other suitable core.

III. Methods of Applying the Coating Composition to Veneer

The coating composition can be applied to the veneer to be coated by conventional methods such as by roll coating, spraying, dipping, or passing the substrate through a Kiss roll applicator as is known in the art. Other methods for coating substrates with top coat compositions known in the art can also be used.

If additional penetration of coating composition is desired the composition, veneer or both can be preheated. Heating the coating composition reduces viscosity and heating the veneer is believed to open the grain and pores in the wood.

IV. Methods of Curing the Treated Veneer

Typically, the coated veneer is intended to be only partially cured before it is applied to the core ply material, although it can be completely cured in some embodiments, particularly where the coating is applied to the veneer/core plywood material. The degree of partial cure is typically below 60%. The degree of cure can be controlled by adjusting the temperature and time at which the coated veneer is heated. These reaction conditions will have to be adjusted depending on the thickness of the veneer, the desired degree of cure, and the types and ratios of the components in the coating composition, particularly the relative amount of the thermal initiator. However, those of skill in the art can readily determine appropriate reaction conditions to arrive at a desired level of cure. Further, the amount of resin material that wicked into the open pores, and grain structure can be optimized by controlling the relative ratios of the individual components of the coating composition, the reaction temperature, roll pressures and reaction times used in this process.

V. Methods of Applying the Cured Veneer to Inner Plys

Once the veneer is coated and partially cured, it can be applied to the top and, optionally the bottom, of a plywood core. Any suitable adhesive can be used to adhere the partially-cured veneer and the plywood core. In one embodiment, the adhesive is a urea-based adhesive such as known to those in the veneering art.

After the veneer is applied to the core ply, the material is cured by application of heat and/or pressure for a suitable amount of time. Typically, the temperature ranges from between about 200° F. and about 350° F., the pressure ranges from between about 100 and about 250 psi, and the time ranges from between about 2 and about 5 minutes. Conditions outside these ranges can be employed.

VI. Methods for Processing the Resulting Plywood

After the plywood has been prepared, it can be processed using conventional steps, such as but not limited to sawing to appropriate size, sanding, staining and finishing. When used as flooring, the plywood is typically cut into lengths of between about 2 and about 8 feet, and widths of between about 2 and about 6 inches, although lengths and widths outside of these ranges are acceptable. Methods for performing these standard operations are typically no different than they are for conventional plywood.

VII. Additional Aspect—Improving the Dimensional Stability of Thin Wood Veneer

Another aspect of this invention relates to a method for improving the dimensional stability of thin veneer wood to prevent cracking in the coated surface by applying a diluted resin material into the voids, lathe checks, and between grains and further removing the solvent followed by curing the resin material by UV and/or by thermal cure. The UV curing can be accomplished by incorporating any of the photoinitiators described into the coating composition.

In one embodiment, Northern or Appalachian thin veneer sheets (although other veneer sheets can be used) are treated with a monomer polyethylene glycol/acrylate mixture containing an azo free radical catalyst (catalyst containing a N=N group,) where the mixture has a relatively low viscosity, which allows the resin material to wick through the veneer and fill the lathe checks, open voids and other channels parallel to the grains.

The treated veneer can be passed through a gas-fired oven to allow deeper penetration of the resin material and partially cure the resin material. Further heat treatment by lamination finishes the cure.

Similarly, veneer can be treated with radiation curable resins in a suitable, typically volatile, solvent thereby allowing the resinous material to wick through the veneer and fill the lathe checks, open voids and other channels parallel to the grains. The resinous material can be cured by a dual cure process involving both heat and UV-activated free radical initiators. In this embodiment, upon exposure to UV radiation, where the UV-photoinitiator catalyzes cure at the veneer surface, the initial heat of polymerization and IR from UV lamps yields enough heat to activate peroxide cure of part of the remainder of the resin material within the voids and pores. Further heat treatment during lamination of the veneer boards to form the final multi-ply product finishes off the cure of the resinous material in the pores and lathe checks. The end result yields an insoluble material in the lathe checks, open voids and other channels parallel to the grains. Moisture diffusion into the wood is now limited and therefore the common mechanisms of expansion and contraction of the wood due to uptake or loss of water within the cell are deterred.

VIII. Additional Aspect—Treating Solid & Composite Wood Planks with 100% Solids Compositions Another aspect of this invention uses 100% solids UV curable resinous materials including the reactive monomers described above, such as multi-functional acrylates, urethane acrylates, cellulose acrylate derivatives, and combinations thereof. These materials are roll coated onto unfinished plank wood (plank wood can be of solid or composite construction) and UV cured. These compositions also advantageously include a photoinitiator such as those described above. The treated wood is subsequently processed on the finishing line.

The present invention will be better understood with reference to the following non-limiting examples. Each of examples 1-7 use the following "Modified Cycle Testing for Wood/Finish Cracking based on ASTM D1211" to evaluate performance characteristics of the finished products.

This test method can be used to determine the resistance to checking and cracking of cured coating applied to wood or plywood substrates when subjected to sudden changes in temperature and moisture from hot to cold, which is considered one cycle. The test distinguishes between cycles to initial checking or cracking and cycles to final failure. This test is designed to accelerate the appearance of checks or cracks in final finished coated wood product. A summary of results for Examples 1-7 is given in Table 1, following Example 7.

All samples are to be 3"×15". Various grain patterns are selected for testing to obtain more representative results. When possible at least 10 pieces of a particular test are run for better representation of the sample.

1. Place the samples in an oven at 120° F. for 1 hour.

2. Immediately place the samples in a freezer set at −5° F. The samples are to remain in the freezer for 1 hour. The samples need to be moved from the oven to the freezer in less than 5 minutes.

3. Remove the samples from the freezer and place them on a lab bench at room temperature (75+/−3° F.) for 15 minutes.

4. Visually check the samples for any checks or cracks formed in the finish from the cycle.

Steps 1-4 are repeated until a total of 10 cycles are complete.

Evaluation of cracks and reporting data:

All cracks are marked at each end of the crack and labeled as to the cycle they occurred.

Cracks propagating within ½" of the ends of the board are not counted.

A sample fails when:

a) there are 12 cracks with a length over ⅜" long on the sample;

b) there are 4 cracks over 1" long on the sample; or c) there are 2 cracks over 2" long on the sample.

The overall appearance is judged as no cracking, slight cracking, moderate cracking, or severe cracking after all ten cycles are completed.

Examples 1-7 in Table 1 illustrate the usefulness of the present invention.

EXAMPLES FOR WOOD VENEER AND PLANK WOOD STABILIZATION TO PREVENT SURFACE CHECKING

The following examples are broken down into two categories of veneer-treated examples and plank-finished examples where the veneer in most cases is considered thick (⅙ inch).

Example 1

Monomer Acrylate/PEG to Stabilize ⅙ Inch Appalachian Oak Veneer

A coating composition was prepared as follows to have a room temperature viscosity (77° F.) of 30 cps.

| | |
|---|---|
| HDDMA(Sartomer SR239) | 49.5 g |
| Polyethyleneglycol (PEG 600) | 49.5 g |
| Vazo 67 catalyst (3M) | 1.0 g |

This composition was applied via roll coater onto both sides of a 4 ft×4 ft×⅙ inch Appalachian Oak Veneer face at a total application weight of 10 gms/sq ft (5 gms sq/ft per side of veneer). The veneer sample was then further processed through a gas-fired oven set at 170° F. for a period of 2.3 minutes. At this stage, the monomer/PEG blend was only partially cured as noted by a slight oily surface when the surface was warm. Planks were then laminated into 3 ply product at a temperature of 260° F. for 5.5 minutes. During this time frame, the monomer/PEG fully cured within the grain structure of the wood. The composite wood board, comprised of ⅙ veneer face, ⅙ inch core Poplar, Oak or Gum, and ⅙ inch veneer face, was then cut into 3" wide tongue and groove wood flooring, although the invention is not limited to any specific width. The flooring was then coated with existing finish coatings to give the final aesthetics. Ten samples of wood flooring were tested by a modified version of the ASTM D1211-97 test. Results are given in Table 1.

Example 2

Sprayed Urethane Acrylate/Isopropanol to Stabilize 1/12 Inch Appalachian Oak Veneer A coating composition was prepared as follows:

| | |
|---|---|
| Urethane acrylate (Bayer trade name) UAUPLS 2337 | 1678.3 g |
| Isopropanol | 1200.0 g |
| Photoinitiator (Ciba, Irigacure 819) | 8.4 g |
| Photoinitiator (Lamberti Esacure KIP 100F) | 67.1 g |
| Photoinitiator (Benzophenone) | 16.8 g |
| Co-initiator (Sartomer CN371) | 33.6 g |
| Methylethyl Ketone | 350.0 g |
| Surfactant, (Silwet L-7200) | 16.8 g |
| Lupersol 575M75 (Atofina) | 0.08 g |

The coating was sprayed on the loose side and the tight side of 1/12 inch Appalachian Oak veneer using a Divilbus spray gun equipped with a pressure pot, 12-15 psi fluid pressure, 45 psi on atomization. Estimated film thickness was 3-7 mils wet. Samples were allowed to air dry and passed through the UV oven twice at 528 mJ/cm$^2$ per pass for a total of about 1.0 Joule/cm$^2$. UV cured veneer samples were stiffer after cure indicating that acrylate polymerization occurred. Veneer boards were then laminated (tight side up) as the top board of a five ply construction at 260° F. for 5 minutes at 180 psi. These boards were cut into flooring planks and subsequently processed on the coating finishing line. Ten samples of wood flooring were tested by the modified version of the ASTM D1211-97 test.

Example 3

Treatment of Unfinished 3 Ply Plank with ⅙ Inch Appalachian Oak Veneer Face

A water-based sealer composition was prepared as follows:

| | |
|---|---|
| Carboset CR716 acrylic | 67.3 g |
| Sancure 815 polyurethane dispersion (BFG) | 15.0 g |
| Triethylamine | 0.1 g |
| NXZ defoamer | 0.3 g |
| Glycol PM propylene glycol monomethylether | 5.0 g |
| Glycol EB butyl cellusolve | 5.0 g |
| Triton GR SM (Triton Surfinyl) | 0.3 g |

This formulation was roll coated onto unfinished 3 ply construction Appalachian Oak planks (4.4 gms/sq ft.) consisting of a top and bottom oak veneer layer with a center poplar layer. Samples were passed through a convention and IR fired oven to remove the water. Samples were then sanded and finished samples of wood flooring were tested by the modified version of the ASTM D1211-97 test. Results are given in Table 1.

Example 4

Treatment of Unfinished 3 Ply Plank with ⅙ Inch Appalachian Oak Veneer Face

The coating composition described in Example 2 was prepared and applied onto 3 ply Appalachian Oak planks (5.8 g/sq. ft) and subsequently passed through an IR oven to remove the solvent. Samples were then lightly sanded and processed on the UV coating finishing line. Final cure of the sealer composition was achieved through a combination of subsequent UV exposure to initiate radical polymerization and IR heat to promote thermal cure.

Example 5

Treatment of Unfinished 3 Ply Plank with ⅙ Inch Appalachian Oak Veneer Face

A coating composition was prepared as follows:

| | |
|---|---:|
| Dipentaerythritol pentacrylate (Sartomer SR399) | 9382.6 g |
| Photoinitiator (Ciba, Irgacure 184) | 186.7 g |
| Photoinitiator (Benzophenone) | 374.6 g |
| Co-initiator (Sartomer CN371) | 37.3 g |
| Surfactant (Dow DC193) | 34.8 g |
| Lubosol 575M75 (Atofina) | 18.7 g |

The composition was applied onto 3 ply Appalachian Oak veneer planks (9.8 gms/sq. ft) using a three roll coater. The plank temperature was increased to 155° F. and a three roll coater was used to optimize the amount of penetration into the wood. The conditions were as follows: Doctor roll (ceramic, clockwise) 1.9 fpm, Applicator roll (rubber durometer 35-40, clockwise) 55 fpm, wiper roll (48 fpm, chrome, counter clockwise) and line speed was 48 fpm.

This worked well because the applicator roll was moving faster than the line speed, the pressure from running faster creates an excess of material behind the applicator roll that flooded in-between the roll and the veneer thereby optimized the amount of resin material into the veneer. The wiper roll drove excess resin into the veneer voids and pores and removed the excess resin. This process gave a saturated build without any excess resin on the surface to affect other parameters down the line, such as adhesion of coating to veneer. If a three roll coater arrangement had not been used, excess coating might have remained on the surface and not be driven into the veneer and therefore affected the final ultimate performance of the final wood product. Also, if excess resin material were not removed, it might have caused possible delamination between layers in the case when the resin material is roll coated on both sides, or caused possible coating-to-veneer adhesion problems.

The coated and cured composite was lightly sanded and processed on the UV coating finishing line where stain, seal, mineral and topcoats were applied and UV cured. Final cure of the applied inventive composition was achieved through a combination of subsequent UV exposure to initiate radical polymerization and IR heat to promote thermal cure.

Example 6

UV Stain with Additive to Prevent Checking on 3 Ply ⅙ Inch Appalachian Oak Veneer A UV stain composition was prepared as follows:

| | |
|---|---:|
| Akzo UV Stain (Mink) | 2155.3 g |
| NCO bearing aliphatic urethane acrylate (Bayer trade name) UAUPLS 2337 | 1258.7 g |
| Photoinitiator (Ciba, Irgacure 819) | 6.3 g |
| Photoinitiator (Lamberti Esacure KIP 100F) | 50.3 g |
| Photoinitiator (Benzophenone) | 12.6 g |
| Co-initiator (Sartomer CN371) | 25.2 g |
| Surfactant (Silwet L-7200) | 12.6 g |
| Lubosol 575M75 (Atofina) | 0.6 g |

The stain composition was applied onto 3 ply Appalachian Oak veneer planks (9.8 gms/sq. ft) using a three roll coater. To optimize the amount of penetration of the resin material into the wood, the parameters used were: doctor roll (10.6 fpm clockwise), applicator roll (72 fpm, clockwise), wiper roll (60 fpm counterclockwise), and line speed 60 fpm. The coated planks were processed on the UV finishing line where seal, mineral and topcoats were applied and UV cured. Final cure of the applied inventive composition was achieved through a combination of subsequent UV exposure to initiate radical polymerization and IR heat to promote thermal cure.

Example 7

UV Stain with Additive to Prevent Checking on 3 Ply ⅙ Inch Appalachian Oak Veneer A UV stain composition was prepared as follows:

| | |
|---|---:|
| Akzo UV Stain (Mink) | 2272.0 g |
| Urethane acrylate (Bayer trade name) UAUPLS 2258 | 454.4 g |
| Urethane acrylate (Bayer trade name) UAUPLS 2265 | 681.6 g |
| Photoinitiator (Ciba, Irgacure 819) | 5.7 g |
| Photoinitiator (Lamberti Esacure KIP 100F) | 45.4 g |
| Photoinitiator (Benzophenone) | 11.4 g |
| Co-initiator (Sartomer CN371) | 22.7 g |
| Surfactant (Silwet L-7200) | 11.4 g |
| Lubosol 575M75 (Atofina) | 0.6 g |

Similar to Example 4, the stain composition was added applied onto 3 ply Appalachian Oak veneer planks (9.8 gms/sq. ft) and processed on the UV finishing line where stain, seal, mineral and topcoats were applied and UV cured. Final cure of the applied inventive composition was achieved through a combination of subsequent UV exposure to initiate radical polymerization and IR heat to promote thermal cure.

Example 8

Treatment of Unfinished 5 Ply Plank with ¹⁄₁₀ Inch Northern Oak Veneer Face

The water-based sealer composition of Example 3 was roll coated onto unfinished 5 ply construction Northern Oak planks, processed and tested in a manner similar to Example 3. Results of the control and Example 8 are given in Table 1.

Example 9

Treatment of Unfinished 5 Ply Plank with ⅜ Inch Northern Oak Veneer Face

A water-based sealer composition of similar to Example 3, but with 20% by weight of PEG 600 was hand applied onto unfinished 5 ply construction Northern Oak planks, processed and tested in a manner similar to Example 3. The application rate was about 4.5 to about 5 grams/sq ft. Results of the control and Example 9 are given in Table 1.

Examples 10 to 12

Sprayed Coating Compositions to Stabilize ¹/₁₂ Inch Northern Oak Veneer

The following coating compositions were applied onto unfinished 5 ply construction Northern Oak planks, processed and tested in a manner similar to Example 2. Results of the control and Examples 10 to 12 are given in Table 1.

Example 10

A coating composition was prepared as follows:

| | |
|---|---|
| Dipentaerythritol pentacrylate (Sartomer SR399) | 2714.0 g |
| Isopropanol | 2714.0 |
| Photoinitiator (Ciba, Irgacure 184) | 54.3 g |
| Photoinitiator (Benzophenone) | 108.6 g |
| Methylethyl Ketone | 1392.8 g |
| Surfactant (Silwet L-7200) | 10.9 g |
| Lubosol 575M75 (Atofina) | 5.4 g |

Example 11

A coating composition was prepared as follows:

| | |
|---|---|
| Urethane acrylate (Sartomer CN133) | 862.3 g |
| Dipentaerythritol pentacrylate (Sartomer SR399) | 287.4 g |
| Propoxylated HDDA (Sartomer CD564) | 1724.5 g |
| Photoinitiator (Ciba, Irgacure 819) | 14.4 g |
| Photoinitiator (Lamberti Esacure KIP 100F) | 115.0 g |
| Photoinitiator (Benzophenone) | 28.7 g |
| Co-initiator (Sartomer CN371) | 57.5 g |
| Methylethyl Ketone | 3880.1 g |
| Surfactant, (Silwet L-7200) | 28.7 g |
| Lupersol 575M75 (Atofina) | 1.4 g |

Example 12

A coating composition was prepared as follows:

| | |
|---|---|
| Di-trimethyolpropane tetraacrylate (Sartomer SR355) | 2157.7 g |
| Isopropanol | 2157.7 g |
| Photoinitiator (Ciba, Irgacure 819) | 8.6 g |
| Photoinitiator (Lamberti Esacure KIP 100F) | 86.3 g |
| Photoinitiator (Benzophenone) | 43.15 g |
| Co-initiator (Sartomer CN371) | 43.15 g |
| Methylethyl Ketone | 2502.9 g |
| Surfactant, (Silwet L-7200) | 8.6 g |
| Lupersol 575M75 (Atofina) | 0.4 g |

Examples 13 to 15

Monomer Acrylate/PEG to Stabilize ¹/₁₂ Inch Oak Veneer

A coating composition similar to Example 1 was prepared and applied onto unfinished ¹/₁₂ inch 5 ply construction Appalachian, Northern and Southern Oak planks, processed and tested in a manner similar to Example 1. Results of the controls and Examples 13 to 15 are given in Table 1. Fifteen samples and controls were used for the Appalachian and Northern Oaks; 22 samples and controls were used for the Southern Oak.

TABLE 1

Summary of Examples

| Ex # | Application Rate (g/ft2) | Board Type Veneer/plank | # of Plys Laminated Product | Cycles to First Crack (avg. of 10 samples) | Cycles to Failure (avg. of 10 samples) |
|---|---|---|---|---|---|
| Control | None | ⅙ inch Appalachian | 3 ply | 3 | 4.7 |
| 1 | 5 | ⅙ inch Appalachian | 3 ply | 7.5 | 10.1 |
| 2 | Sprayed | ⅙ inch Appalachian | 5 ply | 9.7 | 10.8 |
| 3 | 4.4 | ⅙ inch Appalachian unfinished plank | 3 ply | 5.8 | 10.6 |
| 4 | 5.8 | ⅙ inch Appalachian unfinished plank | 3 ply | 8 | 10.8 |
| 5 | 9.8 | ⅙ inch Appalachian unfinished plank | 3 ply | 6.8 | 10.6 |
| 6 | 9.8 | ⅙ inch Appalachian unfinished plank | 3 ply | 4.9 | 9.4 |
| 7 | 9.8 | ⅙ inch Appalachian unfinished plank | 3 ply | 8.8 | 10.7 |

TABLE 1-continued

Summary of Examples

| Ex # | Application Rate (g/ft2) | Board Type Veneer/plank | # of Plys Laminated Product | Cycles to First Crack (avg. of 10 samples) | Cycles to Failure (avg. of 10 samples) |
|---|---|---|---|---|---|
| Control | None | 1/10 inch Northern | 5 ply | 2.7 | 5.9 |
| 8 | 4.4 | 1/10 inch Northern | 5 ply | 4.5 | 7.1 |
| Control | None | 3/8 inch Northern | 5 ply | 3.4 | 6.4 |
| 9 | 4.5-5 | 3/8 inch Northern | 5 ply | 4.8 | 7.2 |
| Control | None | 1/12 inch Northern | 5 ply | — | 6.9 |
| 10 | Sprayed | 1/12 inch Northern | 5 ply | 6.8 | 9.1 |
| 11 | Sprayed | 1/12 inch Northern | 5 ply | 6.1 | 9.2 |
| 12 Northern | Sprayed | 1/12 inch | 5 ply | 5.2 | 8.1 |
| Control | 5 | 1/12 inch Appalachian | 5 ply | 4.0 | 7.0 |
| 13 | 5 | 1/12 inch Appalachian | 5 ply | 4.9 | 8.5 |
| Control | 5 | 1/12 inch Northern | 5 ply | 4.7 | 7.7 |
| 14 | 5 | 1/12 inch Northern | 5 ply | 4.7 | 8.7 |
| Control | 5 | 1/12 inch Southern | 5 ply | 6.6 | 9.3 |
| 15 | 5 | 1/12 inch Southern | 5 ply | 9.7 | 11 |

Example 1 was coated with monomer acrylate/PEG by roll coating both sides.

Example 2 was coated with LS2337 urethane acrylate by spraying the loose and tight side.

Example 3 was coated with CR716 acrylic by roll coating.

Example 4 was coated with LS2337 urethane acrylate by roll coating.

Example 5 was coated with SR399 dipentaerythritol pentacrylate by roll coating.

Example 6 was coated with LS2337 urethane acrylate by roll coating.

Example 7 was coated with Stain Additive: LS2258 and LS2265 by roll coating.

Example 8 was coated with CR716 acrylic by roll coating.

Example 9 was coated with CR716 acrylic by hand application.

Example 10 was coated with SR399 dipentaerythritol pentacrylate by spraying.

Example 11 was coated with CN133 urethane acrylate, SR399 dipentaerythritol pentacrylate and CD564 propoxylated HDDA by spraying.

Example 12 was coated with SR355 di-trimethyolpropane tetraacrylate by spraying.

Examples 13 to 15 were coated with monomer acrylate/PEG by roll coating both sides.

As shown in the Examples, less than 20 grams/sq ft of the resin material is applied to the wood component, and therefore the component comprises less than 20 grams/sq ft of the cured product. In some cases, less than 15 grams/sq ft of the resin material is applied, and in other cases, less than 12 grams/sq ft of the resin material is applied. When the vacuum impregnation process of the prior art is used, about 28% to about 30% by weight of an oak component is impregnated into the oak component. Maple absorbs about 50% by weight the of resin material in the prior art vacuum process, and basswood absorbs about 120% to about 150% by weight of the resin material.

Having disclosed the subject matter of the present invention, it should be apparent that many modifications, substitutions and variations of the present invention are possible in light thereof. It is to be understood that the present invention can be practiced other than as specifically described. Such modifications, substitutions and variations are intended to be within the scope of the present application.

What is claimed is:

1. A wood flooring product comprising a component selected from the group consisting of first veneer layer and a plank, the component having a first surface and a second surface, wherein the portion of the component adjacent the first surface comprises a thermal initiator and a cured product selected from the group consisting of (a) the cured product of a hydrophilic polymer and a reactive monomer, and (b) the cured product of a (meth)acrylate selected from the group consisting of a urethane (meth)acrylate, a multifunctional (meth)acrylate and combinations thereof, wherein the portion of the component adjacent the second surface is substantially free of the cured product.

2. The wood flooring product of claim 1, wherein the portion of the component adjacent the first surface of the component further comprises a staining agent.

3. The wood flooring product of claim 1, wherein the hydrophilic polymer is polyethylene glycol and the reactive monomer is hexanediol dimethacrylate.

4. The wood flooring product of claim 1, wherein the component is a first veneer layer and the wood flooring product further comprises a substrate, the second surface of the veneer layer being adhered to the substrate.

5. A wood flooring product comprising a substrate, a first veneer layer and a second veneer layer, the first veneer layer having a first surface and a second surface, wherein the portion of the first veneer layer adjacent the first surface comprises a thermal initiator and a cured product selected from the group consisting of (a) the cured product of a hydrophilic polymer and a reactive monomer, and (b) the cured product of a (meth)acrylate selected from the group consisting of a urethane (meth)acrylate, a multifunctional (meth)acrylate and combinations thereof, wherein the portion of the first veneer layer adjacent the second surface is substantially free of the cured product, the second veneer layer having a first surface and a second surface, the second surface of the second veneer layer being adhered to the substrate, the portion of the second veneer layer adjacent the first surface of the second veneer layer comprising the cured product.

6. The wood flooring product of claim 5, wherein the portion of the second veneer layer adjacent the second surface of the second veneer layer is substantially free of the cured product.

7. A wood flooring product comprising a component selected from the group consisting of first veneer layer and a plank, the component having a first surface and a second surface, wherein the portion of the component adjacent the first surface and the portion of the component adjacent the second surface comprise a thermal initiator and a cured product selected from the group consisting of (a) the cured product of a hydrophilic polymer and a reactive monomer, and (b) the cured product of a (meth)acrylate selected from the group consisting of a urethane (meth)acrylate, a multifunctional (meth)acrylate and combinations thereof, wherein the concentration of the cured product in the portions of the component adjacent the first surface and adjacent the second surface is at least twice as great as the average concentration of the cured product in the center portion of the component.

8. The wood flooring product of claim 7, wherein the concentration of the cured product in the portion of the component adjacent the first and second surfaces is at least three times as great as the average concentration of the cured product in the center portion of the component.

9. The wood flooring product of claim 8, wherein the concentration of the cured product in the portion of the component adjacent the first and second surfaces is at least five times as great as the average concentration of the cured product in the center portion of the component.

10. The wood flooring product of claim 7, wherein the center portion of the component is substantially free of the cured product.

11. The wood flooring product of claim 7, wherein the portion of the component adjacent the first surface of the component further comprises a staining agent.

12. The wood flooring product of claim 7, wherein the hydrophilic polymer is polyethylene glycol and the reactive monomer is hexanediol dimethacrylate.

13. The wood flooring product of claim 7, wherein the component is a first veneer layer and the wood flooring product further comprises a substrate, the second surface of the veneer layer being adhered to the substrate.

14. The wood flooring product of claim 13, further comprising a second veneer layer adhered to the substrate opposite the first veneer layer, the second veneer layer having a first surface and a second surface, the second surface of the second veneer layer being adhered to the substrate, the portion of the second veneer layer adjacent the first surface of the second veneer layer comprising the cured product.

15. The wood flooring product of claim 14, wherein the concentration of the cured product in the portion of the veneer adjacent the first surface and adjacent the second surface of the veneer is at least twice as great as the average concentration of the cured product in the center portion of the second veneer.

16. The wood flooring product of claim 14, wherein the center portion of the second veneer is substantially free of the cured product.

* * * * *